March 8, 1960
J. A. MOORE ET AL
2,927,741
WIRE COILING DEVICE
Filed June 29, 1954
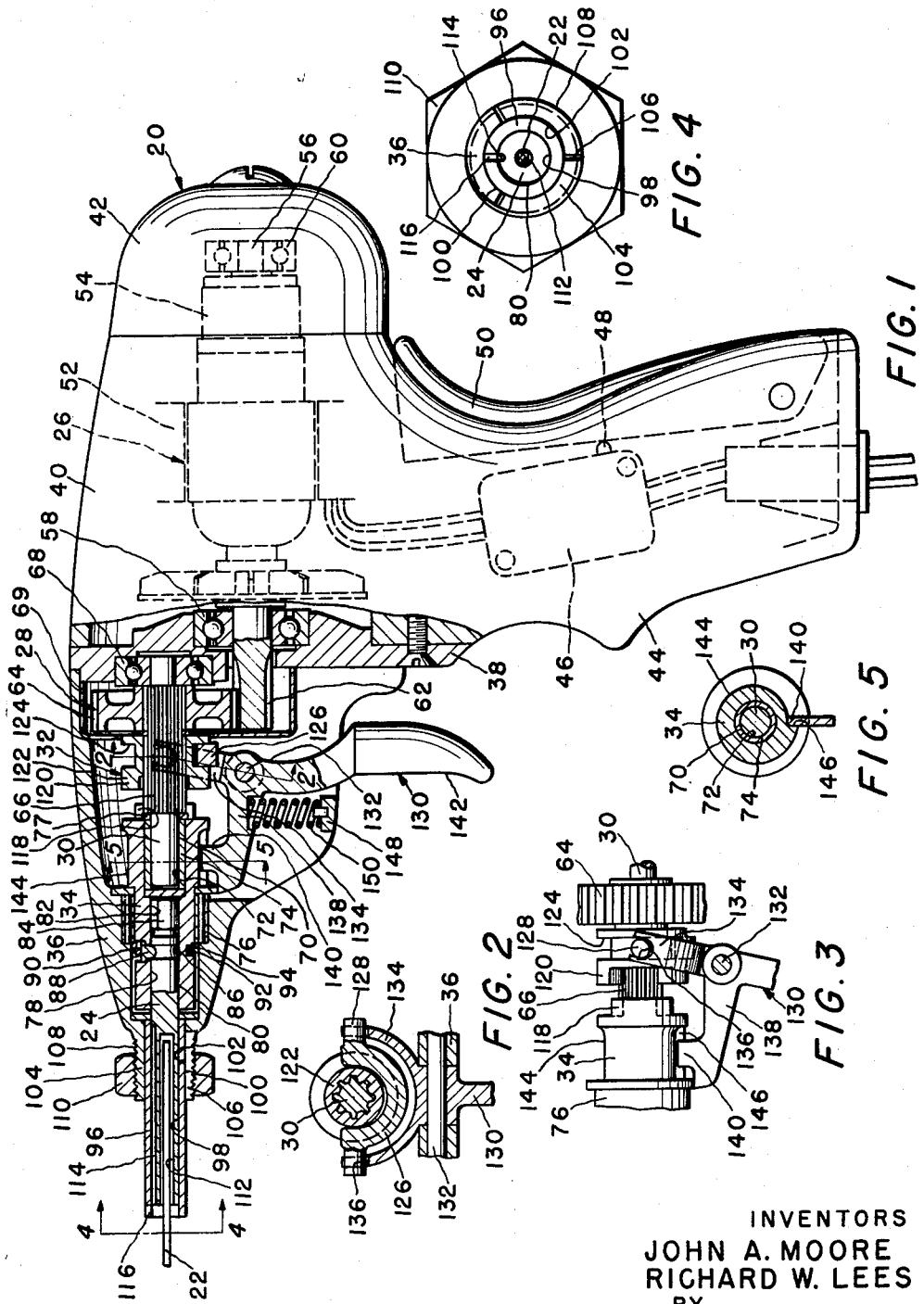
INVENTORS
JOHN A. MOORE
RICHARD W. LEES
BY
THEIR ATTORNEY

United States Patent Office 2,927,741
Patented Mar. 8, 1960

2,927,741

WIRE COILING DEVICE

John A. Moore, Sayre, and Richard W. Lees, Athens, Pa., assignors to Ingersoll-Rand Company, New York, N.Y., a corporation of New Jersey Application June 29, 1954, Serial No. 439,952

1 Claim. (Cl. 242—7)

This invention relates to wire coiling devices.

One object of the invention is to provide a motor-driven wire coiler having a clutch actuated by a shift lever independently of the motor switch, thereby obviating the necessity of repeated starting and stopping of the motor for successive coiling operations.

Another object is to provide such a coiler with a motor switch trigger on the handle and a clutch shift lever in the casing located at opposite sides of the handle.

Other objects will be apparent from the following description of the accompanying drawings, which illustrate a preferred embodiment of the invention in which similar numerals refer to similar parts.

Fig. 1 is a side elevation of an electric motor-driven wire coiler, partly in section, constructed in accordance with the practice of the invention, Fig. 2 is a cross section taken along the line 2—2 of Fig. 1 looking in the direction indicated by the arrows, Fig. 3 is a side elevation, partly broken away, of a detail of the clutch, Fig. 4 is an enlarged end view taken along the line 4—4 of Fig. 1 looking in the direction indicated by the arrows, and Fig. 5 is a cross section taken along the line 5—5 of Fig. 1 looking in the direction indicated by the arrows.

Referring to Fig. 1 of the drawings, the invention is shown as applied to a wire coiler 20, adapted to coil the bare end of a wire around a stationary terminal 22 of rectangular cross section. The coiler includes a wire holding bit 24 driven by a motor 26 by means of spur gearing 28, a drive shaft 30, a clutch 32 and a driven spindle 34 having a positive drive connection with the bit 24. The whole mechanism is contained in a casing consisting of a clutch housing 36, a bearing housing 38, a motor housing 40 and a rear housing 42.

The motor housing 40 has a handle 44 containing a switch 46 having a plunger 48 actuated, when the handle is grasped, by a trigger 50 pivotally connected at one end to the rearward side of the handle. More particularly, the motor 26 comprises a stator 52 located in the motor housing 40 and a rotor 54 mounted on a motor shaft 56 therein, which is supported by conventional anti-friction bearings 58 and 60 mounted in the bearing housing 38 and the rear housing 42, respectively.

The spur gearing 28 comprises a pinion 62 on the motor shaft 56 and a gear 64 fixedly mounted on the drive shaft 30 by means of splines 66. The drive shaft 30 is supported at its rear end by an anti-friction bearing 68 mounted in the bearing housing 38, and a housing 69 encloses the gears 62 and 64 and the bearing 68.

The forward end of the drive shaft 30 comprises a cylindrical surface 70 rotatable in a matching bore 72 in a bushing 74 pressed into the rear end of the driven spindle 34, which is supported by an anti-friction bearing 76 mounted in the clutch housing 36. A washer 77 with an outside diameter slightly greater than that of the splines 66 and encircling the cylindrical surface 70 between the splines and the driven spindle 34 is provided as a thrust bearing to accommodate any axial force imposed by the driven spindle. This construction not only provides a rigid bearing support for the drive shaft 30, but also permits of free and independent rotation of the driven spindle 34.

Contained within the forward end of the driven spindle 34, in axial alignment with the bore 72, is a bore 78 which has a sliding fit with a matching cylindrical surface 80 on the wire holding bit 24. In axial alignment with the bores 72 and 78 and forming a continuation of bore 78 therebetween, is a polygonal-shaped surface 82 which is adapted to fit a correspondingly shaped rear portion 84 of the bit 24, thereby providing a positive drive between the driven spindle 34 and the bit 24. In order to retain the bit 24 in the driven spindle 34 an annular groove 86 is provided in the surface 80 to receive a pin 88 slidably fitting a transversely extending hole 90 in one side of the driven spindle 34 and held in place by a split spring ring 92 contained in an annular groove 94 in the periphery of the driven spindle.

The forward end of the bit 24 is supported by a stationary sleeve 96 which has a bore 98 slidably fitting the cylindrical surface 89 and an outer cylindrical surface 100 for slidably fitting a bore 102 in the forward portion 104 of the clutch housing 36. The portion 104 contains three equally-spaced longitudinally-extending slots 106 trisecting its forward end and an external tapered thread 108 for receiving a correspondingly taper-threaded nut 110 which, when turned along the thread 108, acts with the forward portion 104 to serve as a chuck for holding the stationary sleeve 96 in place.

In the forward axial portion of the bit 24 is a longitudinally extending circular bore 112 to slidably receive the terminal 22 when the wire coiler 20 is applied thereto. The forward end of the bit 24 is also provided with a circular-bottomed axially extending groove 114 formed along its side and of sufficient width to permit of free sliding movement of a wire therein. Likewise, a transversely located slot 116 is formed in the forward end of the sleeve 96 to receive the stationary portion of a wire and prevent rotation thereof during the operation of coiling a wire about the terminal 22.

In accordance with the practice of the invention, the clutch 32 comprises a square jaw 118 on the rear end of the driven spindle 34 for engaging a matching jaw 120 on the forward end of a collar 122 which slidably engages the splines 66 on the drive shaft 30. An annular groove 124 is provided in the periphery of the collar 122 rearwardly of the jaw 120 to slidably receive a yoke 126 having trunnions 128 on diametrically opposite sides thereof.

For the purpose of sliding the collar 122 into engagement with the driven spindle 34, a shift lever 130 is provided which is pivotally connected to the clutch housing 36 by a pin 132. The upper end of the shift lever 130, which is of bellcrank shape, comprises two arms 134 in line with the body of the lever 130 and have slots 136 for interlocking engagement with the trunnions 128. Another arm 138 on the shift lever at approximately a right angle to the arms 134 has an extension 140 for engagement with the driven spindle 34 to serve as a stop member therefor. The lower portion 142 of the shift lever 130 serves as a trigger and is shaped to conveniently fit the fore-finger of the operator.

The peripheral surface of the rear portion of the driven spindle 34 comprises a cam surface 144, shown more particularly in Fig. 5, which has a radially-extending surface 146 for engagement with the extension 140 to prevent rotation of the spindle 34 upon release thereof by the clutch jaw 120. The angular relation between the surface 146 and the polygonal-shaped surface 82 is such that, when the extension 140 and the surface 146 are in engagement, the groove 114 will always be returned to the same starting, or home, position for easy location by the operator in inserting the next wire to be coiled. In the present showing the groove 114 is homed in alignment with the slot 116. Another common practice is to flare a portion of the end of the sleeve 96 to form a funnel-shaped opening (not shown) and home the groove 114 in alignment with the funnel. The bit is rotated into the home position, after the clutch 32 has been disengaged, by the rotative inertia force of the driven spindle 34 and the relatively small frictional force between the shaft 30 and the bit bushing 74, which forces are sufficient to overcome the frictional forces tending to stop the bit.

Interposed between an arm 148 of the clutch housing 36 and the arm 138 of the shift lever 130 and positioned substantially parallel to the lower portion 142 thereof, is a precompressed helical spring 150. Therefore, the spring 150 constantly urges the shift lever 130 to disengage the clutch 32 and prevent rotation of the bit 24.

In operation, a wire is inserted into the groove 114 to its full depth, bent around through the slot 116 and, if desired back along the outside of the sleeve 96, and held immovable by the operator. The coiler 20 is then placed over the stationary terminal 22 so that the terminal is inserted in the bore 112 to a depth of at least a sufficient length to accommodate the finished coil.

The motor 26 is started by the operator gripping the handle 44, thereby depressing the trigger 50 to rotate the drive shaft 30, which is kept running continuously. Rotation of the bit 24 is next effected by depressing the trigger 142 to overcome the force of the spring 150. In this way the extension 140 is withdrawn from the path of movement of the surface 146 and the clutch jaw 120 is simultaneously moved into engagement with the jaw 118 to drive the driven spindle 34 and the bit 24. Since the wire is doubled back along the outside of the sleeve 96 or otherwise held immovable by the operator it cannot be drawn through the slot 116 toward the terminal 22. Therefore, the rotation of the bit 24 causes the free end of the wire to be withdrawn from the groove 114 and wrapped around the terminal 22 to form a coil.

Upon completion of such coil, the coiler 20 is removed from the terminal 22 and the trigger 142 is released, thereby permitting the spring 150 to disengage the clutch 32 and the extension 140 to ride the cam surface 144 until the extension engages the surface 146 to stop the free rotation of the spindle 34 and the bit 24. In these positions of the parts the groove 114 is in its home position—e.g., in alignment with the slot 116, for the insertion of another piece of wire.

It will be noted that the position of the trigger 50 on the rear side of the handle 44 makes it convenient to keep the motor 26 running as long as the operator grasps the handle 44. This mode of operation permits the use of the motor 26 of small size, as only sufficient power is required to bring the light weight spindle 34 and the bit 24 up to speed and coil the wire. Likewise, the inertia of the continuously rotating rotor 54 and shaft 56, the gears 62 and 64, and the drive shaft 30 helps the driving torque of the motor. Consequently, the necessity of overcoming the inertia of all the moving parts in a repetitive start and stop operation is eliminated. Furthermore, with the motor running at maximum speed throughout the entire coiling operation, a tight coil is expeditiously attained by reducing the chance of the operator backing off the coiler 20 before the coil is completed.

Thus, a device of simple and compact construction is provided for coiling a wire without requiring the starting and stopping of the motor for each coiling operation, and the efficiency of the coiler is thereby greatly enhanced.

We claim:

In a power driven wire coiling device having a casing with a handle attached thereto and a bit adapted to hold a wire, said bit being driven by a motor mounted in the casing, the combination comprising, a switch for constantly operating the motor upon gripping said handle, said switch including a trigger extending longitudinally along said handle and conforming to the rear contour thereof, said trigger being movable to energize said switch, a drive shaft driven by said motor, a driver slidably interlocked with the drive shaft, a spindle having a radially extending stop surface, said spindle being adapted for rotation by said drive shaft, a speed reducing device connecting said motor to said drive shaft, a clutch between said drive shaft and spindle adapted to effect engagement therebetween independently of said switch, a second trigger forward of said handle adapted to be digitally operated to engage and disengage said clutch independently of the operation of said motor, and an extension on the second trigger for engaging the stop surface when the trigger is moved to disengage the clutch.

References Cited in the file of this patent

UNITED STATES PATENTS

| | | |
|---|---|---|
| 732,391 | Allen | June 30, 1903 |
| 1,405,640 | Taigman | Feb. 7, 1922 |
| 1,634,801 | Schneider | July 5, 1927 |
| 1,896,820 | Jolidon | Feb. 7, 1933 |
| 1,911,000 | Scott | May 23, 1933 |
| 2,528,489 | Bednash et al. | Nov. 7, 1950 |
| 2,649,121 | Reck | Aug. 18, 1953 |
| 2,696,656 | Madden | Dec. 14, 1954 |
| 2,762,248 | Nelson | Sept. 11, 1956 |